United States Patent
Park

(10) Patent No.: US 7,354,086 B2
(45) Date of Patent: Apr. 8, 2008

(54) CUP HOLDER STRUCTURE FOR VEHICLES

(75) Inventor: In-Heum Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 133 days.

(21) Appl. No.: 11/319,465

(22) Filed: Dec. 29, 2005

(65) Prior Publication Data
US 2006/0278790 A1 Dec. 14, 2006

(30) Foreign Application Priority Data
May 24, 2005 (KR) .................. 10-2005-0043712

(51) Int. Cl.
*B60N 3/10* (2006.01)

(52) U.S. Cl. ................. 296/24.34; 296/1.07; 296/37.8; 224/926

(58) Field of Classification Search ............ 296/24.34, 296/1.07, 37.12, 37.8, 37.13; 248/311.2, 248/312, 312.1, 314; 224/926
See application file for complete search history.

(56) References Cited

U.S. PATENT DOCUMENTS

| | | | |
|---|---|---|---|
| 3,516,111 A * | 6/1970 | Kerry | 16/2.1 |
| 4,163,374 A * | 8/1979 | Moore et al. | 62/457.4 |
| 4,759,584 A * | 7/1988 | Dykstra et al. | 297/188.16 |
| 5,018,633 A * | 5/1991 | Toth et al. | 248/311.2 |
| 5,634,621 A * | 6/1997 | Jankovic | 248/311.2 |
| 5,833,056 A * | 11/1998 | Goldman | 206/199 |
| 6,170,787 B1 * | 1/2001 | Morgan | 248/311.2 |
| 6,712,325 B2 | 3/2004 | Choi | |
| 6,851,736 B1 * | 2/2005 | Klopp et al. | 296/37.8 |
| 7,036,700 B2 * | 5/2006 | Engel et al. | 224/501 |
| 2005/0072889 A1 * | 4/2005 | Park | 248/311.2 |
| 2005/0269472 A1 * | 12/2005 | Wagner et al. | 248/311.2 |
| 2007/0090256 A1 * | 4/2007 | Hansen et al. | 248/311.2 |

FOREIGN PATENT DOCUMENTS

| | | | |
|---|---|---|---|
| EP | 0633162 | | 9/1997 |
| JP | 2000-318531 | | 11/2000 |
| KR | 2004-686235 | * | 11/2002 |
| KR | 2003-011543 | * | 9/2003 |
| KR | 2004-164874 | * | 8/2004 |

OTHER PUBLICATIONS

English Language Abstract of JP 2000-318531. Nov. 30, 2005.

* cited by examiner

*Primary Examiner*—Jason S Morrow
(74) *Attorney, Agent, or Firm*—Greenblum & Bernstein, P.L.C.

(57) ABSTRACT

A cup holder structure for vehicles includes a housing at a console and having a receiving space defined therein, a holder part disposed in the receiving space of the housing such that the holder part can be vertically moved, the holder part having entrances positioned at a top part thereof to hold beverage containers, a vertical elastic member disposed between a bottom of the housing and the holder part to provide an elastic force to the holder part, and a locking member to restrict upward movement of the holder part, which is effected by the vertical elastic member. When the holder part is moved upward, the beverage containers are held by the holder part. When the holder part is moved downward, articles are received in the receiving space of the housing. Consequently, space utilization is maximized.

12 Claims, 6 Drawing Sheets

CUP HOLDER STRUCTURE FOR VEHICLES

BACKGROUND OF THE INVENTION

1. Field of the Invention

The present invention relates to a cup holder structure for vehicles, and, more particularly, to a cup holder structure for vehicles comprising a holder part disposed, in a vertically movable fashion, in a receiving space formed in the console of a vehicle such that the receiving space is used not only to hold cups but to receive other articles as well, thereby enabling effective space utilization in the limited interior space of a vehicle.

2. Description of the Related Art

During a long journey by vehicle, a driver and/or a passenger of the vehicle may need to drink water or other beverages. Generally, such water or other beverage is provided in a cylindrical container, such as a cup or a can.

A cup holder, which serves to hold such a cup or a can, is mounted in the vehicle. The driver and/or the passenger of the vehicle does not continuously hold the container while drinking. The container is temporarily held by a cup holder when the driver and/or the passenger of the vehicle is not drinking.

The cup holder may be mounted at various parts of the vehicle based on a design of the vehicle. The cup holder is usually mounted at the center fascia or a console of a passenger vehicle.

FIG. 1 is a view illustrating a conventional cup holder structure mounted in the passenger vehicle. As shown in FIG. 1, a front cup holder 5 is mounted at the center fascia 3 of an instrument panel 1 such that the front cup holder 5 can be retracted into the center fascia 3.

In addition, a lower cop holder 9 is mounted at a console 7, at which a side brake, an automatic stick, and/or a console box is disposed, for receiving a beverage container.

The lower cup holder 9 has holding pieces 11, which protrude from the inner circumference of the lower cup holder 9 toward the center of the lower cup holder 9 for securely fixing the beverage container inserted into the lower cup holder 9.

In the conventional cup holder structure with the above-stated construction, when the driver or the passenger of the vehicle presses the front cup holder once, the front cup holder 5, which is retracted in the center fascia 3, is extended out of the center fascia 3. When the driver or the passenger of the vehicle is not drinking a beverage, he/she safely puts the beverage container into the front cup holder 5. Consequently, the driver or the passenger of the vehicle enjoys safe and comfortable driving or riding.

When the container holding function is not needed, the driver or the passenger of the vehicle draws the container from the front cup holder 5, and then pushes the front cup holder 5 such that the front cup holder is retracted into the center fascia 3. At this time, the front cup holder 5 is locked by a locking unit, and therefore, the front cup holder is maintained retracted in the center fascia 3.

The lower cup holder 9 also holds a beverage container. In this case, the beverage container is prevented from shaking by the holding pieces 11.

However, the structure in which the front cup holder is retracted into or extended from the center fascia 3 has a problem in that the operating mechanism is complicated although the space utilization is excellent. Specifically, a great number of components are necessary, and therefore, trouble due to damage to the components frequently occurs. Furthermore, the manufacturing costs are raised as the number of the components is increased.

In addition, the structure in which the lower cup holder is fixed to the console 7 has a problem in that the lower cup holder 9 serves only to hold the cup due to the protruded shapes of the holding pieces 11, and therefore, effective space utilization is restricted.

SUMMARY OF THE INVENTION

Therefore, the present invention has been made in view of the above problems, and it is an object of the present invention to provide a cup holder structure for vehicles that is capable of effectively preventing an increase in the manufacturing costs due to the complicated structure of the cup holder and reduction of the space utilization due to disuse of the cup holder as a receiving space.

In accordance with the present invention, the above and other objects can be accomplished by the provision of a cup holder structure for vehicles, comprising: a housing formed at a console, the housing having a receiving space defined therein; a holder part disposed in the receiving space of the housing such that the holder part can be vertically moved, the holder part having entrances formed at the top part thereof for holding beverage containers; a vertical elastic member disposed between the bottom of the housing and the holder part for providing an elastic force to the holder part; and a locking member for restricting the upward movement of the holder part, which is effected by the vertical elastic member.

Preferably, the cup holder structure further comprises: a switching member vertically movable by manipulation of a user for releasing the locked state of the locking member.

Preferably, the housing has a boundary protrusion protruded inwardly from the inside of the housing such that an upper panel and lower protrusions of the holder part are caught by the boundary protrusion, and therefore, the vertical movement of the holder part is restricted.

Preferably, the cup holder structure further comprises: elastic holders mounted at the entrances of the holder part, respectively, the elastic holders being made of an elastic material for elastically pushing the sides of the beverage containers.

Preferably, each of the elastic holders comprises: an elastic member made of a rubber material and having an inner hollow part; and incision grooves formed at the elastic member in the radial direction at a predetermined interval, the incision grooves being incised from the hollow part of the elastic member.

Preferably, the locking member comprises: a catching protrusion configured to be inserted into the side of the holder part; a connection bar extending from the catching protrusion, the connection bar having an elongated hole formed at one end thereof; a catching piece disposed between the connection bar and the catching protrusion, the catching piece being formed in the shape of a plate; and a horizontal elastic member for elastically pushing the catching piece toward the holder part.

Preferably, the switching member comprises: a pushing piece movable downward by manipulation of the user; an elastic returning member for providing an elastic force necessary to move the pushing piece upward such that the pushing piece is returned to its original position; a supporting piece for preventing upward separation of the elastic returning member, and a wedge-shaped hook formed at the lower part of the supporting piece such that the wedge-shaped hook extends downward from the lower part of the supporting piece.

Preferably, the holder part has rounded sections facing the beverage containers, respectively.

Preferably, the elastic holders are securely fixed to the holder part by thermal fusion, and the vertical elastic member is a spring.

According to the present invention with the above-stated construction, the holder part, which is disposed in the interior of the housing, can be moved upward such that the holder part is used as the cup holder for holding the beverage containers, or can be moved downward such that small-sized articles are received in the interior of the housing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
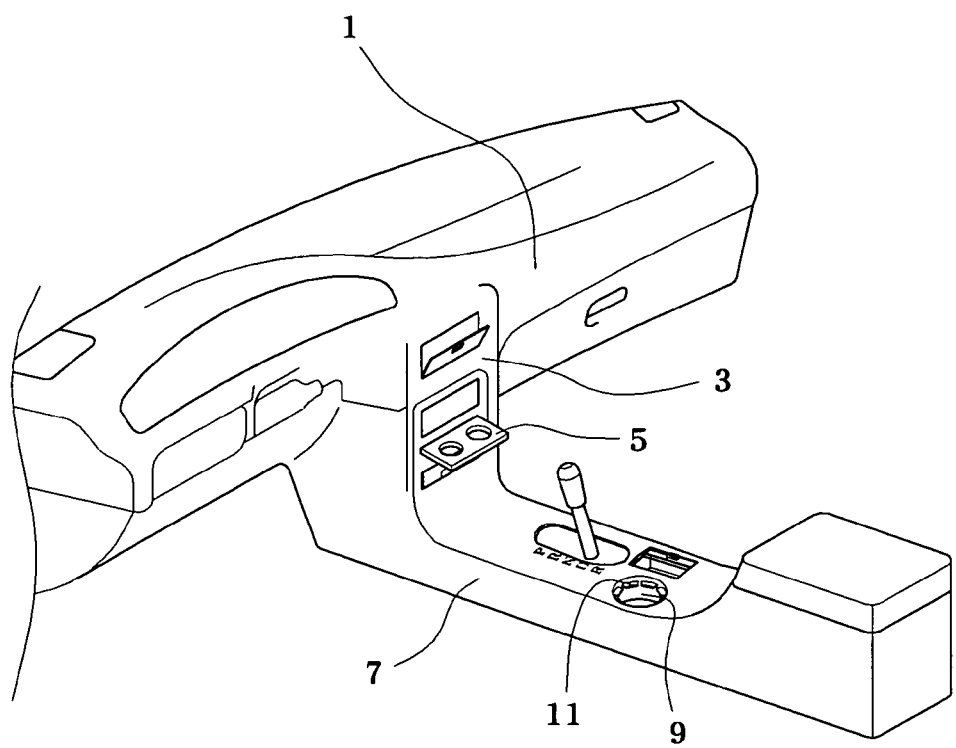
FIG. 1 is a view illustrating a conventional cup holder structure mounted in a vehicle.
Figure 2:
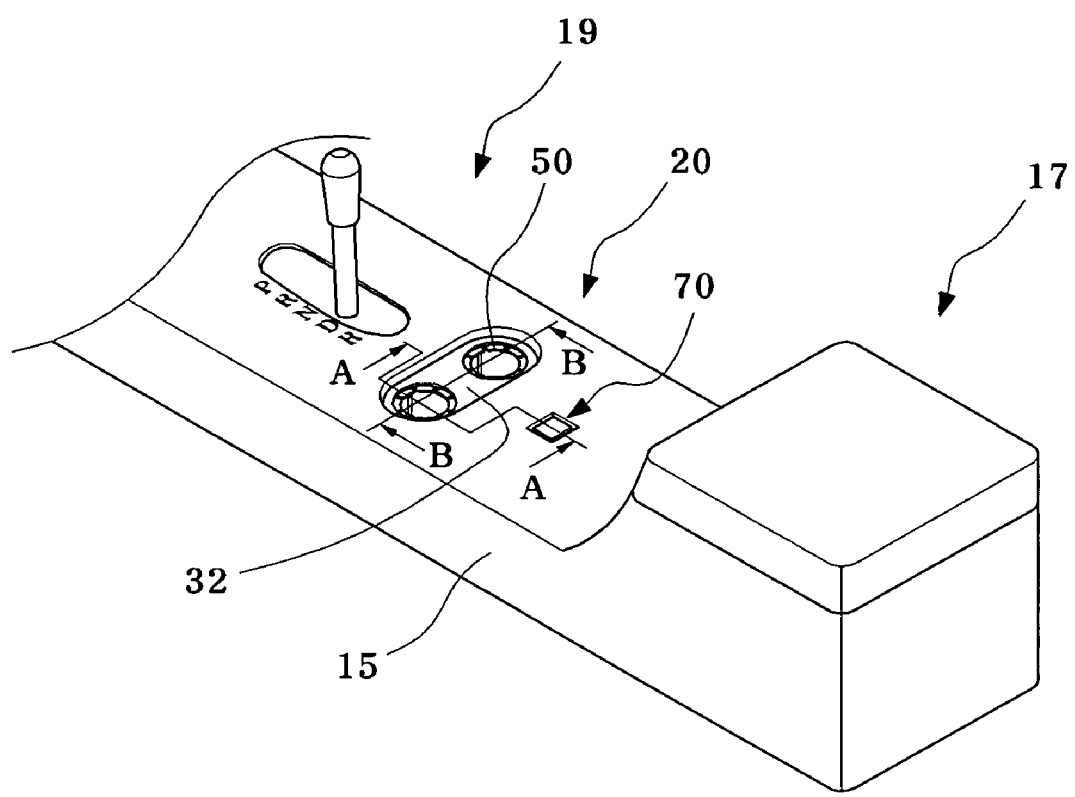
FIG. 2 is a view illustrating a cup holder structure for vehicles according to the present invention mounted in a vehicle.
Figure 3:
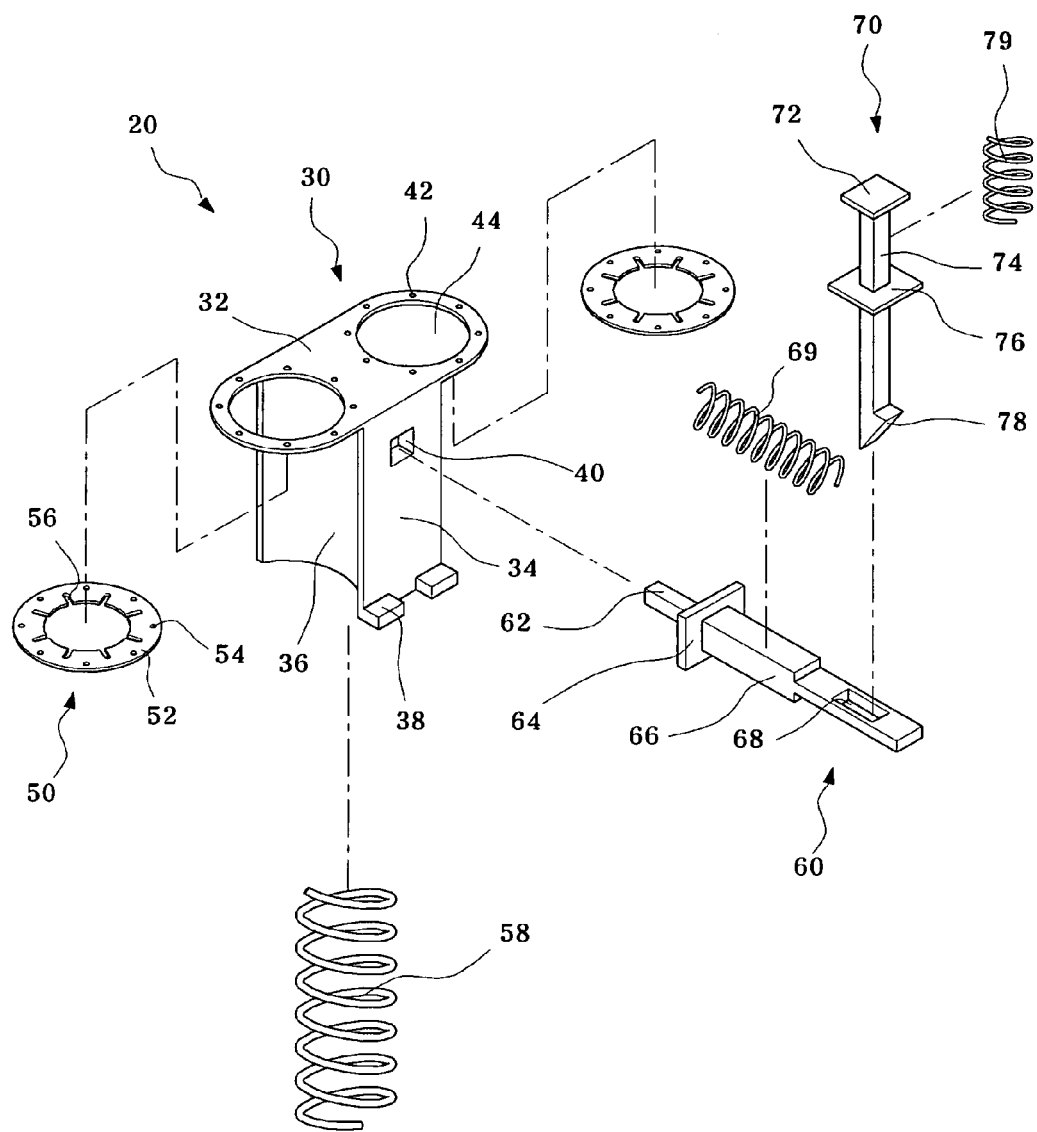
FIG. 3 is an exploded perspective view illustrating principal components of the cup holder structure for vehicles according to the present invention.
Figure 4:
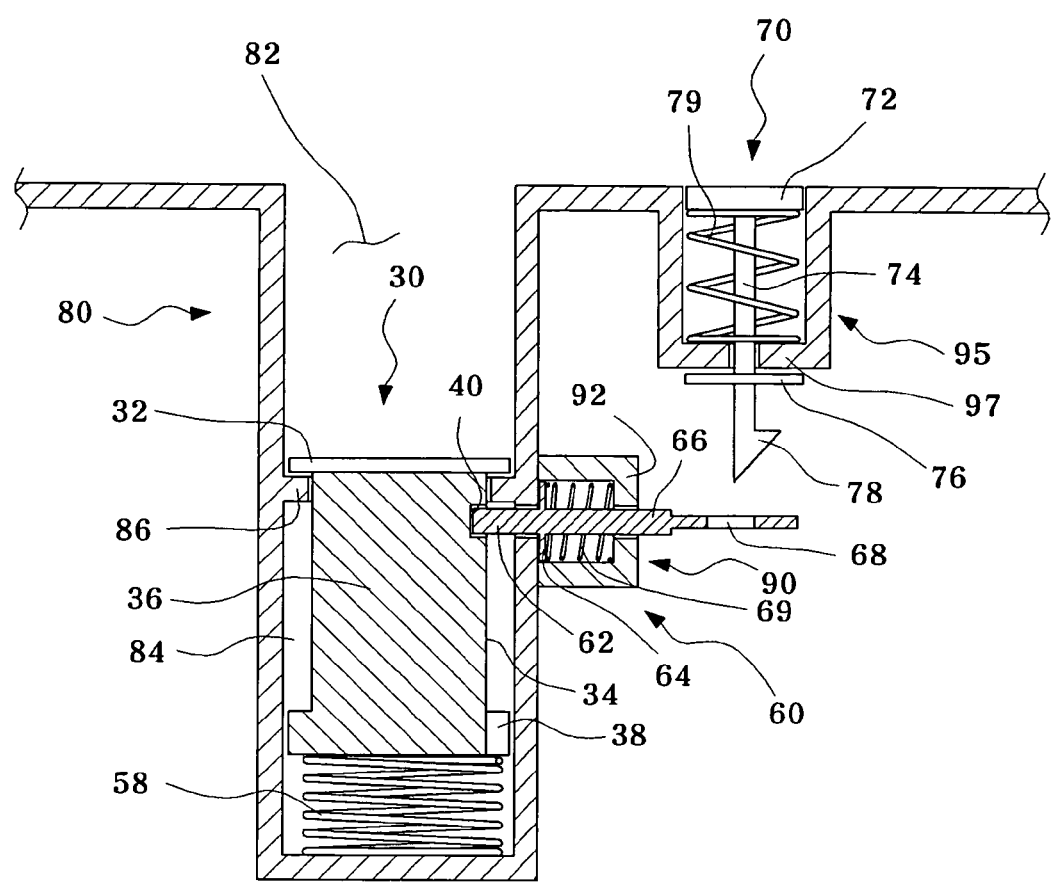
FIG. 4 is a cross-sectional view taken along line A-A of FIG. 2.
Figure 5:
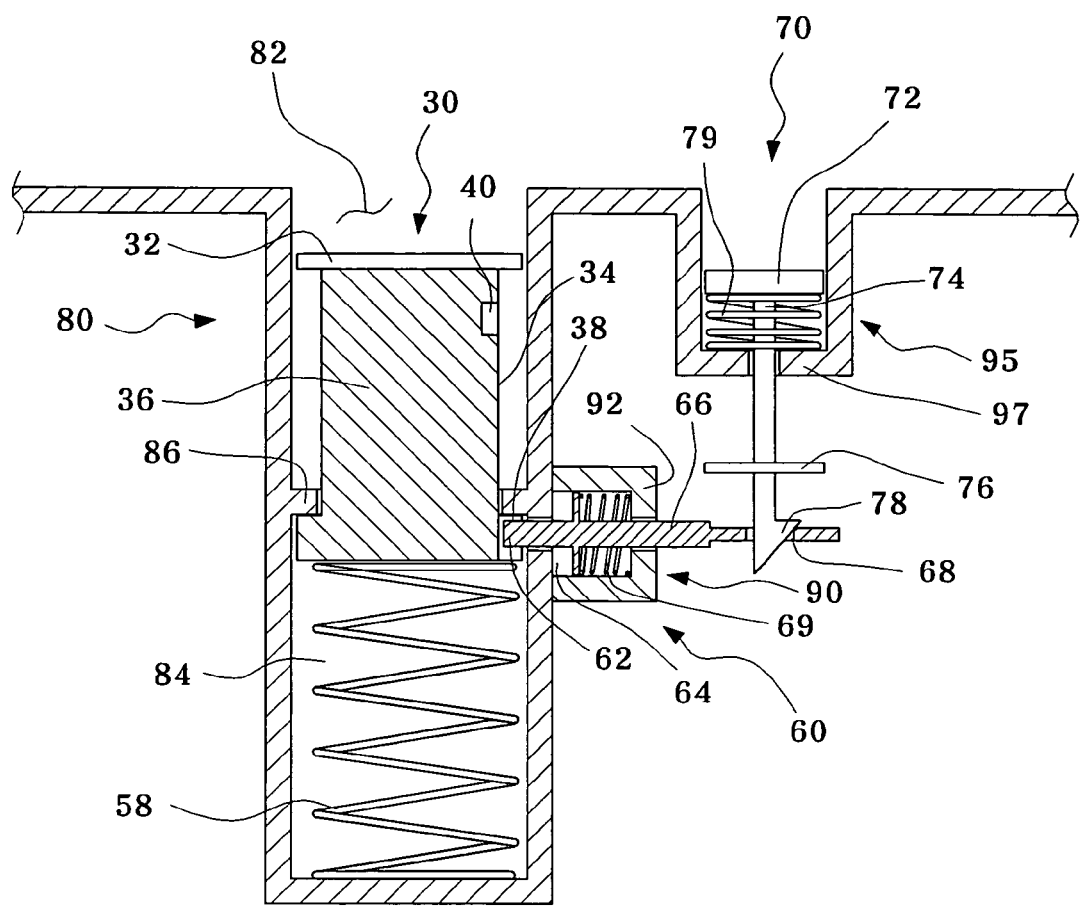
FIG. 5 is a cross-sectional view illustrating extension of a holder part of the cup holder structure for vehicles according to the present invention, which is retracted in FIG. 4.
Figure 6:
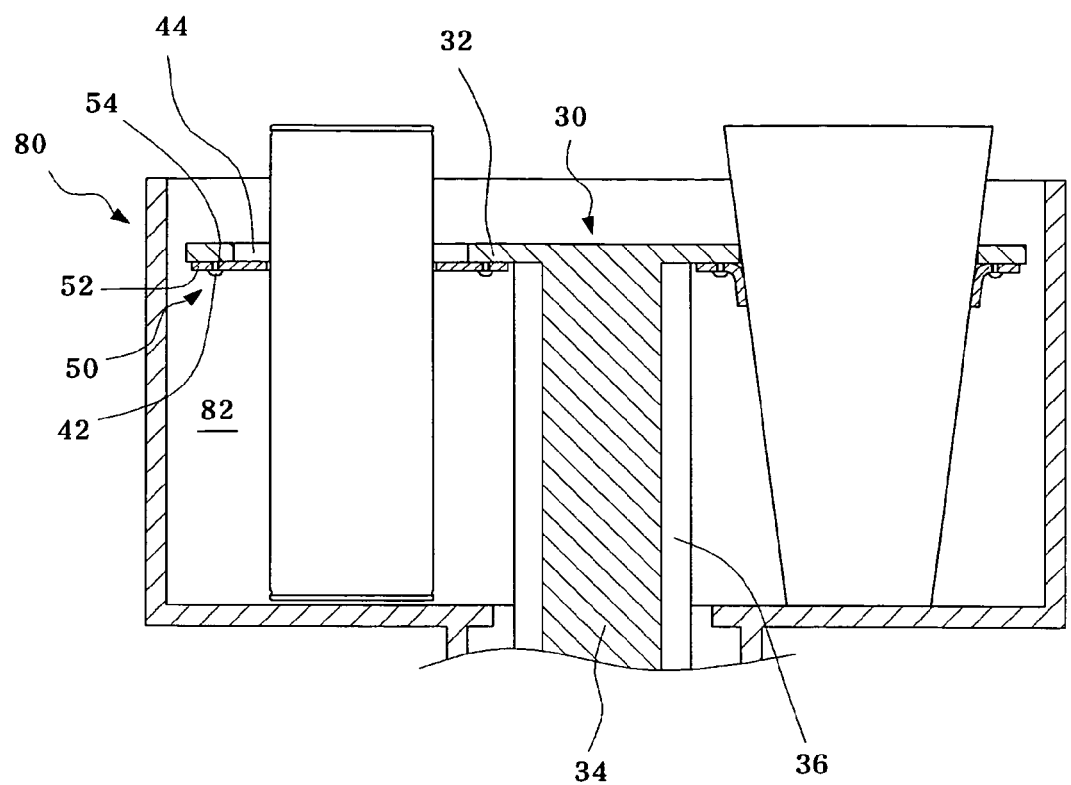
FIG. 6 is a cross-sectional view taken along line B-B of FIG. 2.

FIG. 2 is a view illustrating a cup holder structure for vehicles according to the present invention mounted in a vehicle, FIG. 3 is an exploded perspective view illustrating principal components of the cup holder structure for vehicles according to the present invention, FIG. 4 is a cross-sectional view taken along line A-A of FIG. 2, FIG. 5 is a cross-sectional view illustrating extension of a holder part of the cup holder structure for vehicles according to the present invention, which is retracted in FIG. 4, and FIG. 6 is a cross-sectional view taken along line B-B of FIG. 2.

As shown in FIG. 2, a cup holder 20 is mounted at a console 15, which is disposed between the driver seat and front passenger seat of the vehicle.

At one side of the console 15 is disposed a console box 17, in which relatively bulky articles are received. At the other side of the console 15 is disposed a gear box 19 having a gear lever.

Now, the overall structure of the cup holder 20 for vehicles will be described in detail with reference to FIGS. 3 to 6.

The console 15 includes a housing 80 having an inner space defined therein. At the inside of the housing 80 is formed a boundary protrusion 86, which is protruded inwardly from the inside of the housing 80.

The inner space of the housing 80 is divided into a receiving space 82, which is a space defined above the boundary protrusion 86, and a lower space 84, which is a space defined below the boundary protrusion 86.

In the inner space of the housing 80 is disposed a holder part 30, which is vertically movable along the inner space of the housing 80, i.e., the receiving space 82 and the lower space 84. At the top part of the holder part 30 is disposed an upper panel 32 having two entrances 44, through which two beverage containers are introduced, respectively.

The holder part 30 has two rounded sections 36 facing the beverage containers, respectively. Also, the holder part 30 has two flat sections 34, which do not face the beverage containers.

Consequently, even when the beverage containers are introduced into the cup holder 30 through the entrances 44 at an oblique angle, the beverage containers are guided by the rounded sections 36, and therefore, the beverage containers are properly held.

At one of the flat sections 34 of the holder part 30 is inwardly formed a catching groove 40 having a predetermined depth. At the lower ends of the flat sections 34 of the holder part 30 are formed lower protrusions 38, which are outwardly protruded.

The upper panel 32 and the lower protrusions 38 of the holder part 30 are caught by the boundary protrusion 86, and therefore, the vertical movement of the holder part 30 is restricted.

To the upper panel 32 are attached two elastic holders 50. Each of the elastic holders 50 comprises: an elastic member 52 made of a rubber material and having an inner hollow part; and incision grooves 56 formed at the elastic member 52 in the radial direction at a predetermined interval, the incision grooves 56 being incised from the hollow part of the elastic member 52.

At the lower surface of the upper panel 32 are formed connection protrusions 42, which protrude downward from the lower surface of the upper panel 32 around the entrances 44. At each elastic member 52 are formed connection holes 54, which are arranged in the circumferential direction at a predetermined interval such that the connection protrusions 42 of the upper panel 32 are inserted into the connection holes 54 of the elastic members 52.

The elastic holders 50 are securely fixed to the holder part 30 by thermal fusion. Specifically, after the connection protrusions 42 of the upper panel 32 are inserted into the connection holes 54 of the elastic members 52, the tip ends of the connection protrusions 42 of the upper panel 32 are heated such that the tip ends of the connection protrusions 42 of the upper panel 32 are melted, and therefore, the elastic holders 50 are securely fixed to the holder part 30.

Because the elastic holders 50 are securely fixed to the holder part 30 by thermal fusion as described above, no additional connection tools are necessary, and therefore, the manufacturing process is shortened.

Between the bottom of the housing 80 and the holder part 30 is disposed a vertical elastic member 58, which provides an elastic force to the holder part 30. In the illustrated embodiment, the vertical elastic member 58 is a spring, although the vertical elastic member 58 may take another shape having an elastic restoring force.

The upward movement of the holder part 30, which is effected by the vertical elastic member 58, is restricted by the provision of a locking member 60, which elastically pushes one of the flat sections 34, where the catching groove 40 is formed.

The locking member 60 includes a catching protrusion 62 configured to be inserted into the catching groove 40 of one of the flat sections 34; a connection bar 66 extending from the catching protrusion 62, the connection bar 66 having an elongated hole 68 formed at one end thereof; a catching piece 64 disposed between the connection bar 6 and the catching protrusion 62, the catching piece 64 being formed in the shape of a plate; and a horizontal elastic member 69 for elastically pushing the catching piece 64 toward the holder part 30.

Above the locking member 60 is disposed a vertically movable switching member 70. When a user pushes the switching member 70, the switching member 70 is moved downward to release the locked state of the locking member 60.

The switching member 70 includes a pushing piece 72 movable downward by manipulation of the user; an elastic returning member 79 for providing an elastic force necessary to move the pushing piece 72 upward, i.e., to return the pushing piece 72 to its original position; a supporting piece 76 for preventing upward separation of the elastic returning member 79; and a wedge-shaped hook 78 formed at the lower part of the supporting piece 76 such that the wedge-shaped hook 78 extends downward from the lower part of the supporting piece 76.

The elastic returning member 79 is disposed around a connection bar 74 connected between the pushing piece 72 and the supporting piece 76.

The horizontal elastic member 69 and the elastic returning member 79 may take various different shapes so long as the horizontal elastic member 69 and the elastic returning member 79 provide elastic restoring forces. In the illustrated embodiment, the horizontal elastic member 69 and the elastic returning member 79 are formed in the shape of a spring, which is economically manufactured and has a relatively simple structure.

The catching piece 64, the horizontal elastic member 69, and the connection bar 66 of the locking member 60 are disposed in a locking member housing 90, which is protruded outward from the outside of the housing 80, such that one end of the horizontal elastic member 69 is in contact with the catching piece 64, and the other end of the horizontal elastic member 69 is in contact with a side boundary panel 92 of the locking member housing 90.

Also, the switching member 70 is disposed in a switching housing 95, which is opened at the upper part thereof, such that the lower end of the elastic returning member 79 is in contact with a lower boundary panel 97 of the switching housing 95, and the upper end of the elastic returning member 79 is in contact with the pushing piece 72.

The supporting piece 76 is disposed such that the supporting piece 76 is in contact with the lower boundary panel 97 of the switching housing 95, and therefore, the upward separation of the switching member 70 is effectively prevented.

Now, the operation of the cup holder structure for vehicles with the above-stated construction according to the present invention will be described in detail.

When a user wishes to use the interior of the housing 80 as the receiving space 82, the user pushes the holder part 30 such that the holder part 30 is moved downward. As a result, the catching protrusion 62 of the locking member 60 is inserted into the catching groove 40 of the holder part 30.

The holder part 30 is placed in the lower space 84 of the housing 80 by the locking member 60, and therefore, the receiving space 82 is formed above the holder part 30 such that articles can be received in the receiving space 82.

When the user wishes to draw the holder part 30 upward to use the holder part 30 as the cup holder, the user pushes the pushing piece 72 of the switching member 70 downward. As a result, the catching hook 78 is moved downward as shown in FIG. 5.

The lower end of the catching hook 78 is inclined downward. Consequently, the catching hook 78 is inserted through the elongated hole 68 while the inclined surface of the catching hook 78 is in contact with the right side of the elongated hole 68, as shown in FIG. 5, and therefore, the connection bar 66, at which the elongated hole 68 is formed, is moved to the right as the catching hook 78 is moved downward.

As the connection bar 66 is moved to the right as described above, the catching protrusion 62 is separated from the catching groove 40, and the holder part 30 is moved upward by means of the elastic restoring force of the vertical elastic member 58 disposed below the holder part 30.

As the holder part 30 is moved upward, the lower protrusions 38 are also moved upward. After the lower protrusions 38 are moved upward to a predetermined height, the lower protrusions 38 are caught by the boundary protrusion 86 protruded from the housing 80.

As shown in FIG. 3, the lower protrusions 38 are spaced a predetermined distance from each other. Consequently, when the lower protrusions 38 are moved upward, and are then caught by the boundary protrusion 86, the catching protrusion 62 is disposed in the space between the lower protrusions 38.

As a result, the holder part 30 is placed in the receiving space 82 of the housing 80.

When the user introduces a beverage container having a relatively small diameter into the holder part 30 through one of the entrances 44, as shown in FIG. 6, the corresponding elastic member 52 is hardly bent. When the user introduces another beverage container having a relatively large diameter into the holder part 30 through the other entrance 44, on the other hand, the corresponding elastic member 52 is severely bent, since the incision grooves 56 are formed at the elastic member 52 of each elastic holder 50 in the radial direction at the predetermined interval, and therefore, the elastic member 52 is brought into contact with the beverage container over a large area.

In this way, beverage containers having various diameters can be introduced into the cup holder according to the present invention by means of the elastic holder 50 having the elastic characteristics as described above.

It should be noted that the structures of the locking member 60 for controlling the upward movement of the holder part 30 and the switching member 70 for controlling the locking member 60 through the manipulation of the user are changed within the basic operational structures suggested according to the illustrated embodiment of the present invention.

As apparent from the above description, the cup holder structure for vehicles according to the present invention is characterized in that various articles are usually received in the receiving space of the housing formed at the console, and, when the cup holding function is required, the holder part is drawn from the lower part of the housing such that the beverage container, such as a cup, can be held by the holder part.

In this way, the space of the cup holder can be used as either the receiving space or the beverage container holding space at need. Consequently, the present invention has the effect of maximizing space utilization.

Furthermore, the vertical movement of the cup holder is accomplished by the relatively simple structure. Consequently, the present invention has the effect of reducing the manufacturing costs of the cup holder.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cup holder structure for vehicles, comprising:
   a housing provided at a console, the housing having a receiving space defined therein;
   a holder part disposed within the receiving space such that the holder part can be vertically moved, the holder part having entrances positioned at a top part thereof to hold beverage containers;
   an elastic member disposed between a bottom of the housing and the holder part to provide an elastic force to the holder part; and
   a locking member to restrict upward movement of the holder part, which is effected by the vertical elastic member,
   wherein the holder part is disposed entirely below an upper surface of the housing during the entire vertical movement of the holder part.

2. The structure as set forth in claim 1, further comprising:
   a switching member vertically movable by manipulation of a user to release the locked state of the locking member.

3. The structure as set forth in claim 1,
   wherein the housing has a boundary protrusion protruded inward from the receiving space such that an upper panel and lower protrusions of the holder part are caught by the boundary protrusion, and therefore, the vertical movement of the holder part is restricted.

4. The structure as set forth in claim 1, further comprising:
   elastic holders mounted at the entrances of the holder part, respectively, the elastic holders being made of an elastic material to elastically push against sides of beverage containers.

5. The structure as set forth in claim 4,
   wherein each of the elastic holders comprises: an elastic member made of a rubber material and having an inner hollow part; and incision grooves configured to extend radially from the elastic member at a predetermined interval, the incision grooves being incised from the hollow part of the elastic member.

6. The structure as set forth in claim 1,
   wherein the locking member comprises: a catching protrusion configured to be inserted into a side of the holder part; a connection bar extending from the catching protrusion, the connection bar having an elongated hole positioned at one end thereof; a catching piece disposed between the connection bar and the catching protrusion, the catching piece being configured in the shape of a plate; and a horizontal elastic member to elastically push the catching piece toward the holder part.

7. The structure as set forth in claim 2,
   wherein the switching member comprises: a pushing piece movable downward by manipulation of the user; an elastic returning member to provide an elastic force necessary to move the pushing piece upward such that the pushing piece is returned to its original position; a supporting piece to prevent upward separation of the elastic returning member; and a wedge-shaped hook configured at the lower part of the supporting piece such that the wedge-shaped hook extends downward from the lower part of the supporting piece.

8. The structure as set forth in claim 1,
   wherein the holder part has rounded sections facing beverage containers, respectively.

9. The structure as set forth in claim 4,
   wherein the elastic holders are securely fixed to the holder part by thermal fusion.

10. The structure as set forth in claim 1,
    wherein the vertical elastic member is a spring.

11. A cup holder structure for vehicles, comprising:
    a housing provided at a console, the housing having a receiving space defined therein;
    a holder part disposed within the receiving space such that the holder part can be vertically moved, the holder part having entrances positioned at a top part thereof to hold beverage containers;
    an elastic member disposed between a bottom of the housing and the holder part to provide an elastic force to the holder part; and
    a locking member to restrict upward movement of the holder part, which is effected by the vertical elastic member,
    wherein the housing has a boundary protrusion protruded inward from the receiving space such that an upper panel and lower protrusions of the holder part are caught by the boundary protrusion, and therefore, the vertical movement of the holder part is restricted.

12. A cup holder structure for vehicles, comprising:
    a housing provided at a console, the housing having a receiving space defined therein;
    a holder part disposed within the receiving space such that the holder part can be vertically moved, the holder part having entrances positioned at a top part thereof to hold beverage containers;
    an elastic member disposed between a bottom of the housing and the holder part to provide an elastic force to the holder part; and
    a locking member to restrict upward movement of the holder part, which is effected by the vertical elastic member,
    wherein the locking member comprises a catching protrusion configured to be inserted into a side of the holder part; a connection bar extending from the catching protrusion, the connection bar having an elongated hole positioned at one end thereof; a catching piece disposed between the connection bar and the catching protrusion, the catching piece being configured in the shape of a plate; and a horizontal elastic member to elastically push the catching piece toward the holder part.

* * * * *